Dec. 23, 1947.          G. W. RUSLER              2,433,160
                    TUNING FORK CONSTRUCTION
                     Filed Sept. 6, 1945
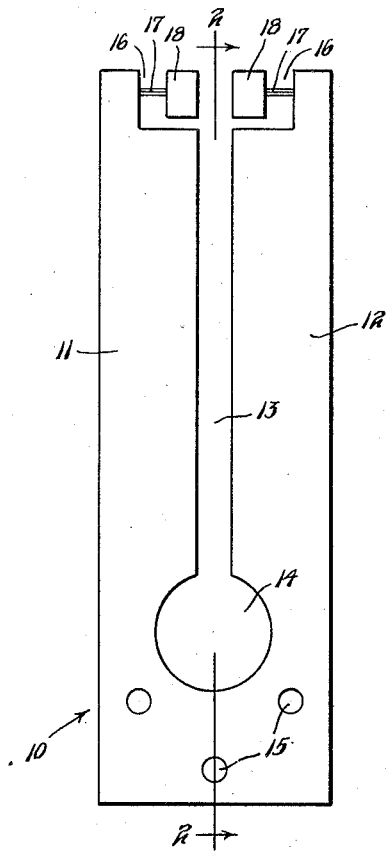
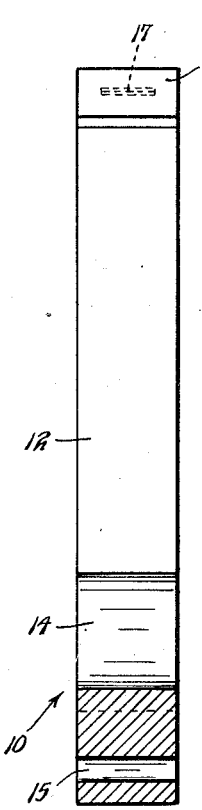
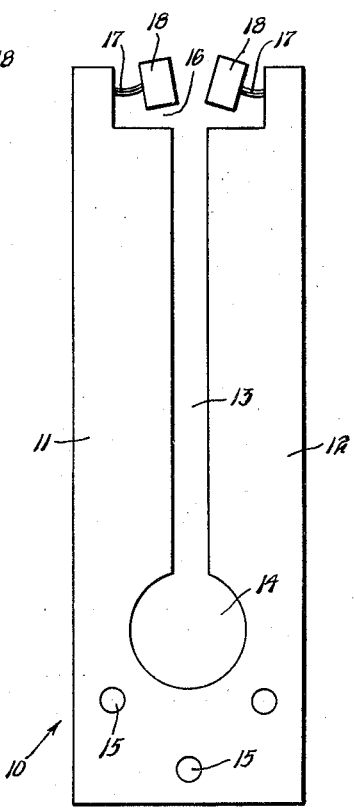
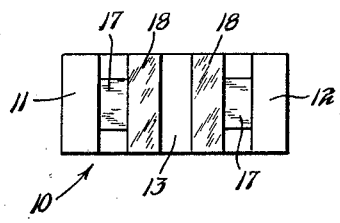
INVENTOR.
GEORGE W. RUSLER
BY
George N. Fisher
ATTORNEY Patented Dec. 23, 1947

2,433,160

UNITED STATES PATENT OFFICE 2,433,160

TUNING FORK CONSTRUCTION

George W. Rusler, Minneapolis, Minn., assignor to Minneapolis-Honeywell Regulator Company, Minneapolis, Minn., a corporation of Delaware Application September 6, 1945, Serial No. 614,694

2 Claims. (Cl. 84—409)

This invention relates to the construction of mechanical vibrating devices and more particularly to tuning forks.

Tuning forks have long been used in mechanical vibrator constructions and their value in such construction is dependent upon the constancy of their vibration rate. It is known that tuning forks are extremely sensitive to changes in temperature and one of the chief causes of variation in the given frequency of the tuning fork is a change in temperature which alters the effective length of the tines of the fork and changes the modulus of elasticity thereof.

Tuning fork designers have in various ways attempted to overcome this cause of unstable frequency. Some of the construction so brought out consisted of the use of special alloys having small coefficients of expansion and elasticity and thus of thermostatically controlled heated enclosures for the tuning forks. These constructions, however, have not been found to be entirely satisfactory due in part to the severe conditions under which they may be required to operate and also on account of the inherent lag of the heating systems employed. For instance, the improved device of this invention may be employed as a time reference in precision bombing. Equipment used in such bombing operations are subjected to a wide range of temperature variations in relatively short periods. In view of the fact that these changes in temperature sometimes exceed 150° F., considerable difficulty has been encountered in attempting to maintain the temperature of any given part of the equipment used in such bombing operations at a constant value. Even when the part is enclosed in a thermostatically heated housing, the difficulty is not obviated because the inherent lag in the system results in over- or under-control and a deviation from the desired value.

In the improved device of this invention means have been provided which function concurrently with any change in the norm of resistance to vibration of the fork material caused by temperature variations to compensate for such change and thereby maintain the rate of vibration of the tines constant. Moreover the means so provided function with equal precision on devices positioned within thermostatically heated enclosures or on devices where no attempt has been made to control the temperature.

It is accordingly an object of the present invention to provide means for automatically compensating for changes in the temperature which affect the modulus of elasticity and the expansion of the material and hence the rate of frequency of vibration.

A further object of advantage and importance resides in the provision of means for incorporating the compensating means of this invention with new or used vibrating devices or tuning forks.

Another object of importance is the provision of means whereby the improved construction may be successfully employed on tuning forks or vibrating devices made from various materials having different thermoelastic and expansion coefficients.

Still another object of importance and advantage resides in the provision of means for mounting compensating means on the tines of a tuning fork so that such means will not have an appreciable damping effect on the free operative movement thereof.

Additional objects of advantage and importance will become apparent as the following detailed description progresses, reference being had to the accompanying drawing, wherein Figure 1 is a plan view of a tuning fork construction which embodies the invention.

Figure 2 is a vertical section taken on line 2—2 of Figure 1.

Figure 3 is a view similar to Figure 1, but showing the temperature responsive members in slightly altered positions.

Figure 4 is an end view of the device.

The reference numeral 10 indicates generally a tuning fork which follows a well known construction and is provided with a pair of tines 11 and 12 arranged in spaced parallel alignment. A space 13 between the tines 11 and 12 and coextensive therewith is preferably provided with a circular enlargement 14 at one end thereof as is clearly shown in the drawing. Formed in the base of the fork 10 is a plurality of securing screw receiving holes 15, which may be employed in attaching the tuning fork to a suitable support. However, it will be apparent that other suitable means may be employed for securing the fork to a supporting member. In the construction of the improved vibrating device of this invention, the tuning fork may be provided with a suitable drive and pick-up arrangement as shown in Patent No. 2,015,410, granted September 24, 1935, or in any other manner well known in the art. Such driving and pick-up arrangements form no part of the present invention and therefore they are not shown in the drawing. Additionally, the tuning fork may be constructed of any suitable material regardless of its temperature expansion and elastic coefficients, as will hereinafter be more fully explained.

In the preferred embodiment of the invention, the upper inside portion of each tine 11 and 12 is provided with a recess 16 as is best shown in Figures 1 and 3. The recesses 16 are shown to be substantially rectangular in shape, but it will be apparent that they may take any other form.

Fixed to each tine closely adjacent the end thereof and within a recess 16 is a bimetal strip 17. The bimetal strips 17 are disposed transversely of the longitudinal axis of the fork 10 and are in opposed relation to each other. The strips are arranged so that at a predetermined temperature value, they assume the position in which they are shown in Figure 1 and upon a fall in temperature from the predetermined value the free ends thereof move upwardly as shown in Figure 3.

Positioned on the free end of each bimetal strip 17 is an identical weight 18. The weights 18 are carefully positioned on the bimetal strip 17 so that their spacing from the vertical portions of the tine are precisely the same. Accordingly, the movement of one weight, upon warping of the bimetal strip is exactly the same as the movement of the other weight. The weights 18 are positioned on the bimetal members 17 so that flexing of the member due to a change in temperature causes a displacement of the weights to compensate for the changes in the modulus of elasticity and expansion or contraction of the fork 10 and thereby maintain the oscillation of the tines at a constant frequency rate. The weight positioning is critical and must be proportional to the elastic and expansion coefficients of the material used in the fork construction. Consequently the spacing between the weights and tines which controls the effective length of the bimetal strips and the extent of movement of the weights may vary over a considerable range in different constructions wherein different materials are employed.

The weight supporting bimetal strips 17 extend substantially in the direction of travel of the tines 11 and 12 so that a driving force exerted thereon is in a direction longitudinal of the strips. Thus, the connection between the weights and the tines in relation to the direction of their concurrent movement is substantially rigid and not resilient. Therefore, there is relatively little or no interchange of energy between the weights and tines when the device is in operation. Although the weights are rigidly attached to the tines for concurrent movement therewith they are also movable relatively of the tines, but in a direction substantially normal to the movement thereof. Accordingly, a change in temperature which, by altering the effective length of the tines and their resistance to flexure, tends to change the frequency is compensated for by the warping of the bimetallic members which displace the weights and thus change the effective length of the tines to maintain a constant frequency.

In the operation of the improved device of this invention, the weights 18 and supporting bimetal strips 17 assume a normal position at a predetermined temperature value. Assume now that the temperature drops sufficiently to alter the operation of the device. Such a departure of the temperature from the predetermined value causes the free ends of the bimetal members and the weights to move upwardly thus increasing the effective length of the tines. Therefore, the change in temperature, which causes the fork to contract and changes its modulus of elasticity to cause an increase in frequency also moves the weights to increase the effective length of the device to cause a decrease in the frequency rate. Inasmuch as the retarding affect of the one counteracts the acceleration affect of the other, the frequency rate of the fork is maintained constant.

A departure of the temperature in an opposite direction causes expansion of the tines and a decrease in resistance to movement which normally would result in a slower vibration rate. But such a temperature departure also results in a downward warping of the bimetal member 17 and movement of the weights 18 to decrease the effective length of the tine. Decreasing the effective length of the tine would normally result in a faster vibration rate. Thus, constant frequency is maintained over a wide temperature range.

There is herein provided a vibrating device constructed of a relatively few cooperating parts arranged to function automatically to compensate for temperature variations therein, which variations normally would result in an altered frequency rate, and maintain the vibration rate at a predetermined frequency. Moreover, the improved device is exceptionally sturdy, accurate and dependable. Furthermore, it is fully automatic and requires no attention, service or adjustments after installation.

It will be apparent to those skilled in the art to which the improved device of this invention appertains that numerous details of construction and design may be altered without departing from the spirit or scope of the invention. Accordingly, the patent granted hereon is not to be limited to the precise embodiment here disclosed or in any other manner except as may be necessitated by the terminology of the appended claims when given the range of equivalents to which they may be entitled.

I claim as my invention:

1. In a vibrator device, a metal member having a pair of tines disposed in spaced parallel relation and a supporting portion, said tines having a section of reduced cross-sectional area adjacent to said supporting portion and being adapted to oscillate at a given frequency rate when said member is maintained at a predetermined temperature level, each of said tines having a recess formed in opposed parallel surfaces closely adjacent to the free ends thereof, temperature responsive elements secured to said tines and disposed in each recess of said tines having a free end extending normally to the longitudinal axis of said tine, and a weight secured to the free end of each of said temperature responsive elements, said temperature responsive elements being operable to control the longitudinal movement of the weights to increments proportional to the elasticity and expansion of said metal member caused by changes in temperature to maintain the frequency rate of oscillation of said tines constant.

2. In a device of the class described, in combination, a member having a supporting portion and a plurality of tines extending therefrom in spaced parallel relation, each of said tines having a section of reduced cross-sectional area adjacent to said supporting portion, said tines being adapted to oscillate at a given frequency rate when said member is maintained at a predetermined temperature, a temperature responsive element secured to each tine adjacent the free end thereof with a weight attached thereto which is movable with said tines and said temperature responsive element transversely of the longitudinal axis of said tines, said temperature responsive elements moving said weights in a direction substantially paralleling said longitudinal axis of said tines as the temperature condition varies, the movement of said weights counteracting the changes in elasticity and expansion of said member to maintain the given frequency rate of oscillation of said tines.

GEORGE W. RUSLER.

REFERENCES CITED

The following references are of record in the file of this patent:

UNITED STATES PATENTS

| Number | Name | Date |
|---|---|---|
| 1,653,794 | Whitehorn | Dec. 27, 1927 |